(12) United States Patent
Boxerman

(10) Patent No.: US 12,442,404 B1
(45) Date of Patent: Oct. 14, 2025

(54) PRESSURE DIFFERENTIAL FASTENER RELEASE MECHANISM

(71) Applicant: United States of America as represented by the Secretary of the Navy, Arlington, VA (US)

(72) Inventor: Jason S. Boxerman, Panama City, FL (US)

(73) Assignee: The United States of America as represented by the Secretary of the Navy

( * ) Notice: Subject to any disclaimer, the term of this patent is extended or adjusted under 35 U.S.C. 154(b) by 764 days.

(21) Appl. No.: 17/514,045

(22) Filed: Oct. 29, 2021

(51) Int. Cl.
*F16B 31/02* (2006.01)

(52) U.S. Cl.
CPC ........ *F16B 31/021* (2013.01); *F16B 2200/63* (2023.08); *Y10T 403/1633* (2015.01); *Y10T 403/22* (2015.01)

(58) Field of Classification Search
CPC .... F16B 31/00; F16B 31/021; F16B 2200/63; Y10T 403/1633; Y10T 403/22
See application file for complete search history.

(56) References Cited

U.S. PATENT DOCUMENTS

| | | | |
|---|---|---|---|
| 9,568,038 B2* | 2/2017 | Donovan | F16B 31/021 |
| 9,952,129 B2* | 4/2018 | Kondo | F16B 31/021 |
| 10,514,054 B2* | 12/2019 | Goldberg | F16B 31/021 |
| 10,670,068 B2* | 6/2020 | Caponera | F16B 31/021 |
| 2021/0300559 A1* | 9/2021 | Solum | F16B 31/021 |

FOREIGN PATENT DOCUMENTS

JP 1998-052164 * 9/1998 ............ F16B 1/00

* cited by examiner

*Primary Examiner* — Michael P Ferguson
(74) *Attorney, Agent, or Firm* — James M. Kasischke; Jeffry C. Severson

(57) ABSTRACT

A fastener release mechanism is provided, which operates utilizing a pressure differential between the mechanism and the surrounding medium. A sealed cavity is fabricated within a shank section of the mechanism. When used in a releasable system, the shank section is exposed to the surrounding medium through a plurality of channel bores fabricated into a head section of the fastener release mechanism. The shank section includes one or more seams or scored areas designed to cause the failure of the shank section when a pressure differential between the pressure of the surrounding medium against the shank section and the pressure within the cavity reaches a designed fracture pressure. The fracture of the shank section can release a part held in place by the threaded section of the fastener release mechanism.

10 Claims, 7 Drawing Sheets

PRESSURE DIFFERENTIAL FASTENER RELEASE MECHANISM

STATEMENT OF GOVERNMENT INTEREST

The invention described herein may be manufactured and used by or for the Government of the United States of America for governmental purposes without the payment of any royalties thereon.

BACKGROUND OF THE INVENTION

(1) Field of the Invention

The present invention relates to fastener release mechanisms. More particularly, the present invention relates to a fastener mechanism utilizing a pressure differential between the pressure in an enclosed chamber within the fastener and the ambient pressure surrounding the fastener to cause the fastener to fail and allow the parts held by the fastener to separate.

(2) Description of the Prior Art

There exist a number of scenarios in which a payload carried by a host vehicle must be released remotely. For example, it may be desired to anchor an autonomous underwater vehicle at a certain depth range. In this example, the payload may be the anchoring mechanism. In a further example, a weather balloon may release an instrument payload at a certain altitude range.

Current, state of the art payload release mechanisms include electrically powered actuators, burn wires, magnetic release mechanisms and spring powered mechanisms. Some mechanisms rely on explosives to destroy the fasteners holding the payload to its supporting part and break them apart. These mechanisms can entail additional storage and handling requirements. Further, these mechanisms may require human input to provide a release signal, stored mechanical power, or electrical power. Generally, such mechanisms add unwanted weight or complexity to the host vehicle-payload system.

Thus, a need exists for a fastener release mechanism, which automatically releases the payload without human input at the time of release. Additionally, there is a need for a fastener release mechanism, which can release the payload without having stored mechanical or electrical power on board the host vehicle. Further, a fastener release mechanism is needed which reduces the overall complexity of a host vehicle-payload system compared with current systems.

SUMMARY OF THE INVENTION

It is therefore an object of this present invention to provide a fastener release mechanism not requiring human input at the time of release. In addition, it is an object of the present invention to provide a fastener release mechanism not requiring stored mechanical power or electrical power. A further object is to provide a fastener release mechanism, which will reduce the overall complexity of a host vehicle-payload system compared with current systems.

The invention includes a fastener release mechanism, which operates utilizing a pressure differential between the mechanism and the surrounding medium. The mechanism includes an airtight cavity within the shank of the fastener. The cavity is sealed from the surrounding medium, though the outer surface of the shank is in communication with the surrounding medium.

The shank is manufactured with fracture points along its length designed such that the shank fails at a certain radial pressure applied against the shank. When the pressure differential between the surrounding medium against the outer surface of the shank and the medium within the shank cavity reaches the design pressure, the shank fails, and the fastener is released. With proper design of the fracture points, the failure pressure can be calibrated to correspond to the fastener reaching a certain depth or distance within the surrounding medium.

As the present invention relies only on the pressure differential for failure of the fastener and release, no human input is required at the time of release. In addition, the fastener release mechanism does not require stored mechanical power or electrical power. As a result, the overall complexity of a host vehicle-payload system can be reduced compared with current systems. Additionally, the operational endurance of a host vehicle can be increased as the vehicle does not need electrical power to deploy a payload. Instead, the power can be used for operation of the host vehicle itself.

In one embodiment, a fastener release mechanism includes a shank section of a fastener with a cavity disposed therein, and a head section with one or more passages disposed therein. The passages provide access for a fluid surrounding the fastener to surround the shank section. A fracture seam is disposed on the shank section. The fracture seam ruptures when a pressure differential between a first pressure of the surrounding medium and a second pressure within the cavity exceeds a design pressure differential.

The fastener can further include a holding section attached to the shank section distant from the head section. The holding section can be capable of passing through a bore in a first part and mating with a second part, with the fracture seam disposed within the bore. The head section can be capable of securing the first part against the second part. The cavity can extend through the head section, with the head section including a plug to seal the cavity. The holding section can include threads which mate with a threaded bore in the second part.

In one embodiment the holding section is fabricated with a plurality of threads. The holding section can pass through a bore in the second part. A threaded nut can mate with the threads and can be secured against the second part. In another embodiment, the holding section includes a malleable end distant from the shank section. The holding section passes through a bore in the second part and the malleable end can be deformed against the second part to secure the first and second part together.

In one embodiment, a system for releasably securing a first part to a second part can include a shank section of a fastener having a cavity disposed therein, a head section of the fastener having one or more passages disposed therein and a holding section attached to the shank section distant from the head section. The holding section can pass through a bore in the first part and mate with the second part. The head section can secure the first part against the second part.

A fracture seam is disposed on the shank section within the bore. The passages provide access for a fluid surrounding the system to enter the bore and surround the shank section. The fracture seam ruptures when a pressure differential between a first pressure of the surrounding medium and a second pressure within the cavity exceeds a design pressure differential. In one embodiment, the holding section can include threads that can mate with a threaded bore in the second part.

In another embodiment, the holding section is fabricated with a plurality of threads and passes through a bore in the second part. A threaded nut mates with the threads and can be secured against the second part to mate the holding section to the second part. In a further embodiment, the holding section can include a malleable end distant from the shank section. The holding section passes through a bore in the second part. The malleable end can be deformed against the second part to mate the holding section to the second part.

In one embodiment, a system for releasably securing a fastener to a first part can include a shank section of the fastener with a cavity disposed therein, a head section of the fastener with at least one passage disposed therein and a holding section attached to the shank section distant from the head section. The holding section can pass through a bore in the first part and mate with the first part. A fracture seam is disposed on the shank section within the bore. The passages provide access for a fluid surrounding the system to enter the bore and surround the shank section. The fracture seam ruptures when a pressure differential between a first pressure of the surrounding medium and a second pressure within the cavity exceeds a design pressure differential.

The system can further include a plurality of threads fabricated on the holding section and a threaded portion of the bore, wherein the plurality of threads mate with the threaded portion.

Alternately, the system can include a plurality of threads fabricated on the holding section, with at least a portion of the threads extending beyond the first part. A threaded nut can mate with the threads and can be secured against the first part to mate the holding section to the first part. As another alternate, the holding section can include a malleable end distant from the shank section and extending beyond the first part. The malleable end can be deformed against the first part to mate the holding section to the first part.

BRIEF DESCRIPTION OF THE DRAWINGS

A more complete understanding of the invention and many of the attendant advantages thereto will be readily appreciated as the same becomes better understood by reference to the following detailed description when considered in conjunction with the accompanying drawings wherein like reference numerals and symbols designate identical or corresponding parts throughout the several views and wherein.

DESCRIPTION OF THE INVENTION

Figure 1:
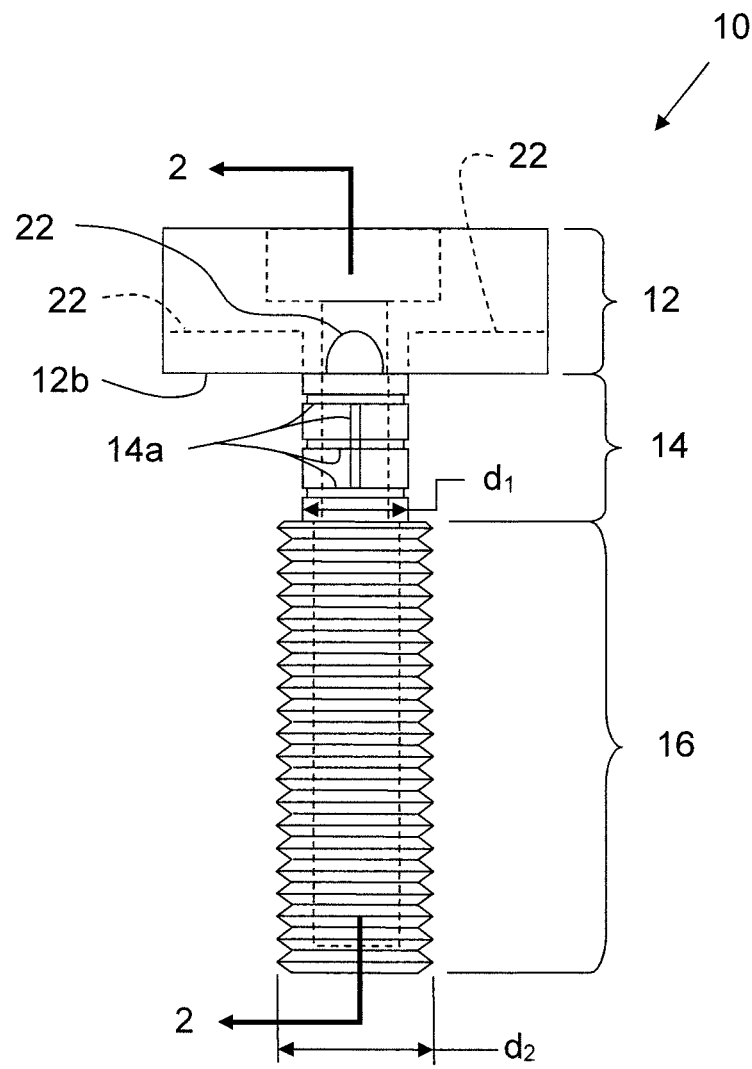
FIG. 1 illustrates a schematic front view of a fastener release mechanism fabricated to release at a designed pressure differential.

Referring now to FIG. 1, there is shown a schematic front view of fastener release mechanism 10, fabricated to release at a designed pressure differential. Mechanism 10 includes head section 12, shank section 14 and holding or thread section 16, each configured in a manner similar to known standard fasteners. For ease of reference hereinafter, fastener release mechanism 10 may be referred to simply as fastener 10. Shank section 14 has an outer diameter $d_1$ smaller than outer diameter $d_2$ of holding section 16. Shank section 14 is fabricated with one or more fracture seams or weakened sections 14a. Seams 14a are designed to control fracturing of shank section 14, as described hereinafter.

Figure 2:
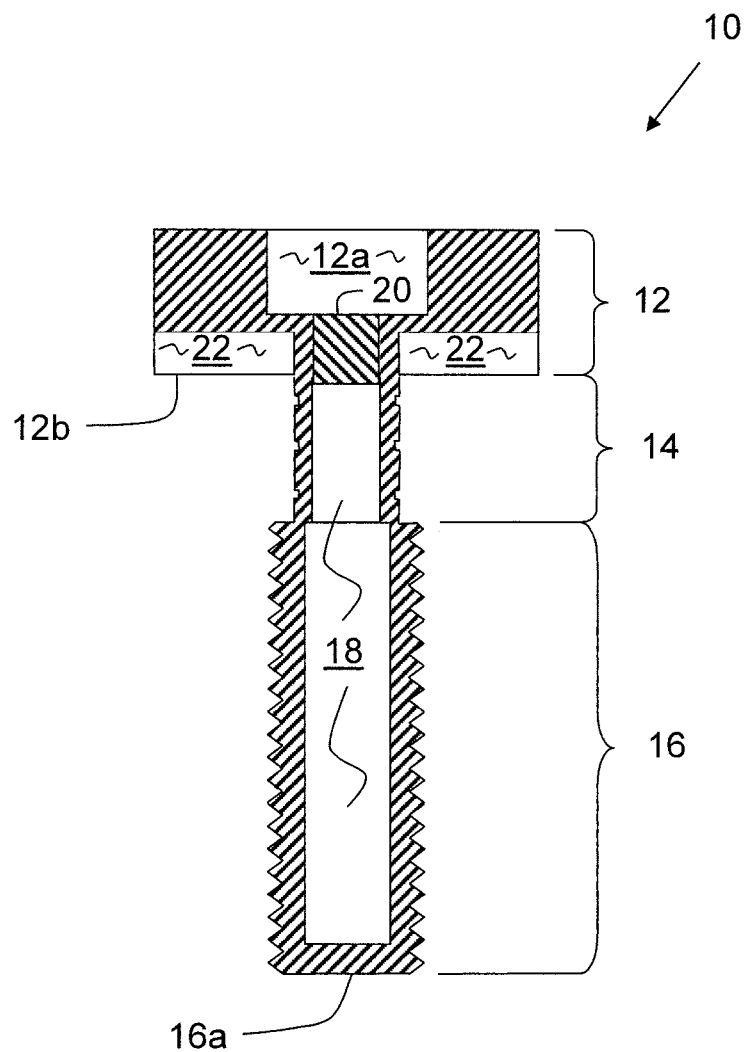
FIG. 2 illustrates a schematic cross-sectional view of the fastener release mechanism taken at line 2-2 of FIG. 1.

Referring now also to FIG. 2, there is shown a schematic cross-sectional view of mechanism 10 taken at line 2-2 of FIG. 1. Cavity 18 is shown disposed within shank section 14 and thread section 16, and is shown in phantom in FIG. 1. Cavity 18 is sealed with plug 20, which is inserted into cavity 18 through cutout 12a in head section 12. A plurality of channel bores 22 are fabricated into lower surface 12b of head section 12. Three bores 22 are shown in FIG. 1, two in phantom and one perpendicular to the plane of FIG. 1.

For ease of fabrication, but not limitation, cavity 18 may vary in diameter between shank section 14 and thread section 16. Further, cavity 18 may be sealed in a variety of manners. For example, plug 20 may be located at lower end 16a of holding section 16, eliminating the need for cutout 12a. Additionally, bores 22 may have any number of configurations.

Figure 3:
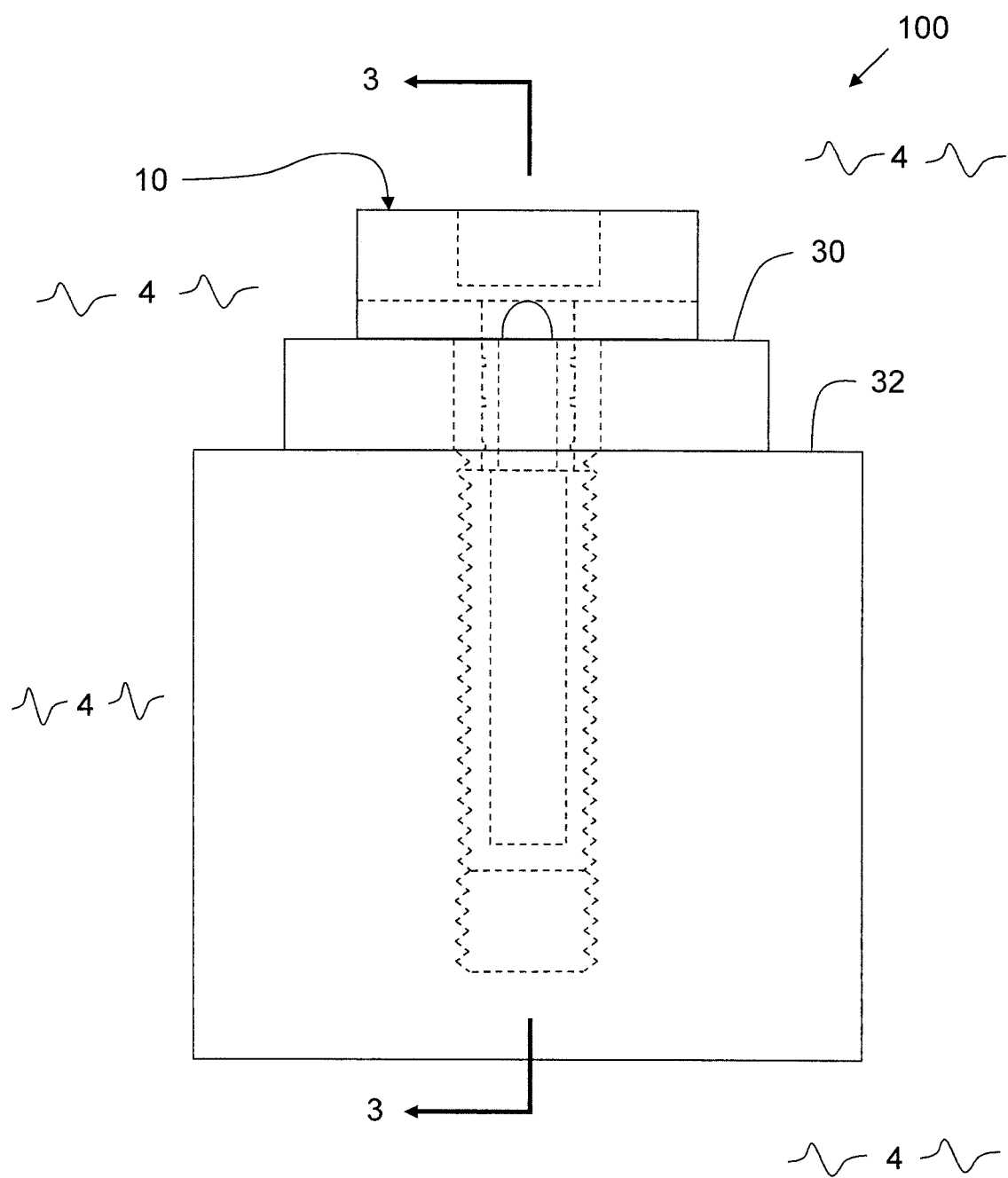
FIG. 3 shows a schematic front view of a releasable system utilizing the fastener release mechanism.
Figure 4:
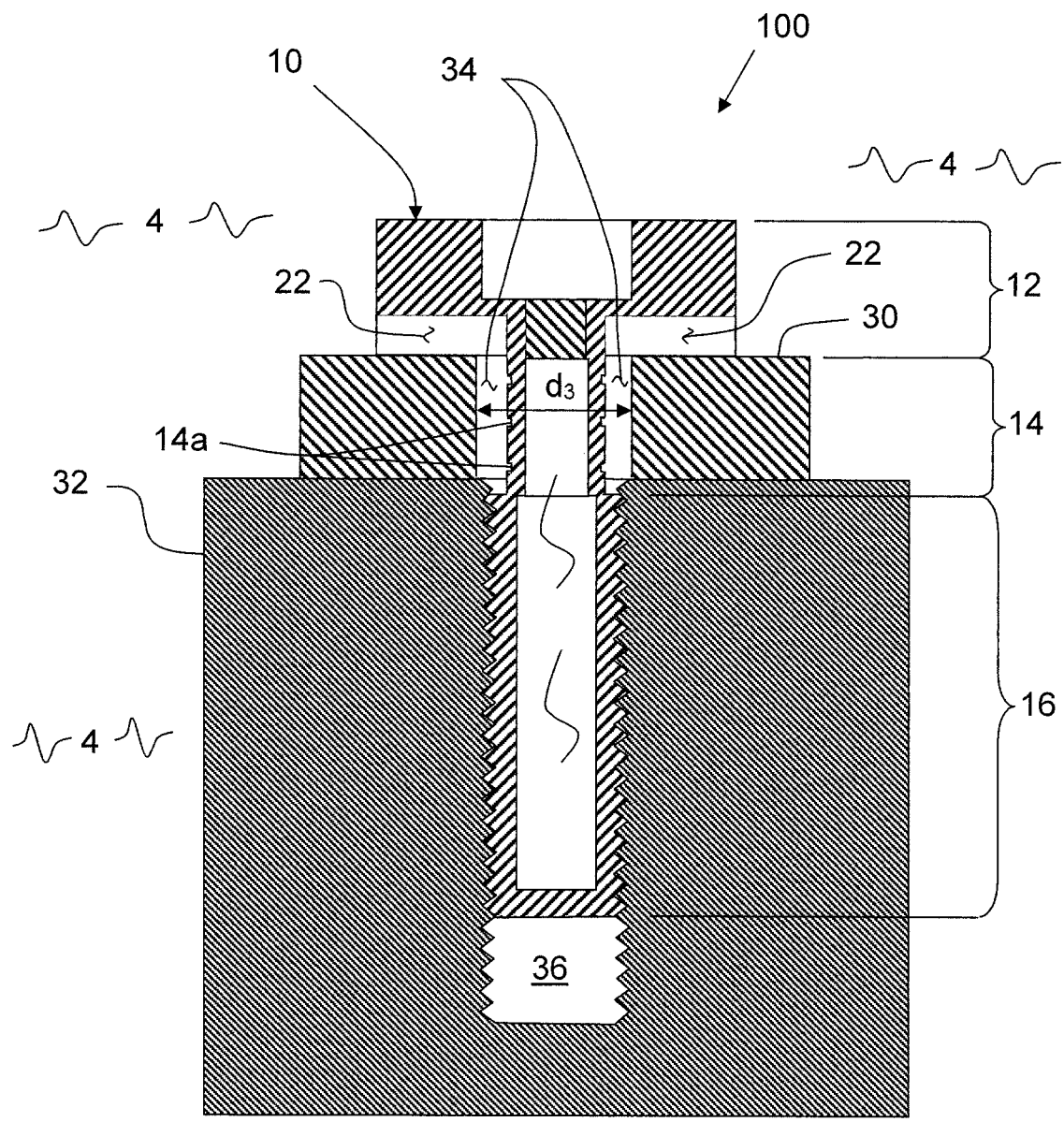
FIG. 4 shows a schematic cross-sectional view of the release system of FIG. 3 taken at line 3-3 of FIG. 3.

Referring now to FIG. 3, there is shown a schematic front view of a releasable system 100 utilizing fastener release mechanism 10. Fastener 10 connects first part 30 to second part 32. Referring now also to FIG. 4, there is shown a schematic cross-sectional view of releasable system 100 of FIG. 3 taken at line 3-3 of FIG. 3. First part 30 is fabricated with full bore 34 for passage of fastener 10 therethrough. Second part 32 is fabricated with threaded bore 36, wherein thread section 16 is mated. As thread section 16 is advanced into threaded bore 36, head section 12 is seated against part 30 to secure part 30 to part 32. As can be seen in FIG. 4, diameter $d_3$ of full bore 34 is at least that of diameter $d_2$ (shown in FIG. 1) of thread section 16 to allow thread section 16 to pass through full bore 34. Thus, channel bores 22 provide a passage for surrounding medium 4 to enter into full bore 34 and surround shank section 14.

As previously noted, cavity 18 is sealed within fastener 10, thus the pressure within cavity 18 remains constant. Changes in the pressure of the surrounding medium 4, e.g., through movement of system 100 within surrounding medium 4, will create changes in a pressure differential between a pressure of surrounding medium 4 on shank section 14 and an internal pressure within cavity 18. As also noted previously, seams 14a (only two of which are shown in FIG. 4 for clarity) are designed to control fracturing of shank section 14.

Seams 14a are designed to cause shank section 14 to fracture along at least one of seams 14a when the pressure differential reaches or exceeds the specific, designed fracture pressure. When shank section 14 fails, second part 32 is free to separate from first part 30.

Figure 5:
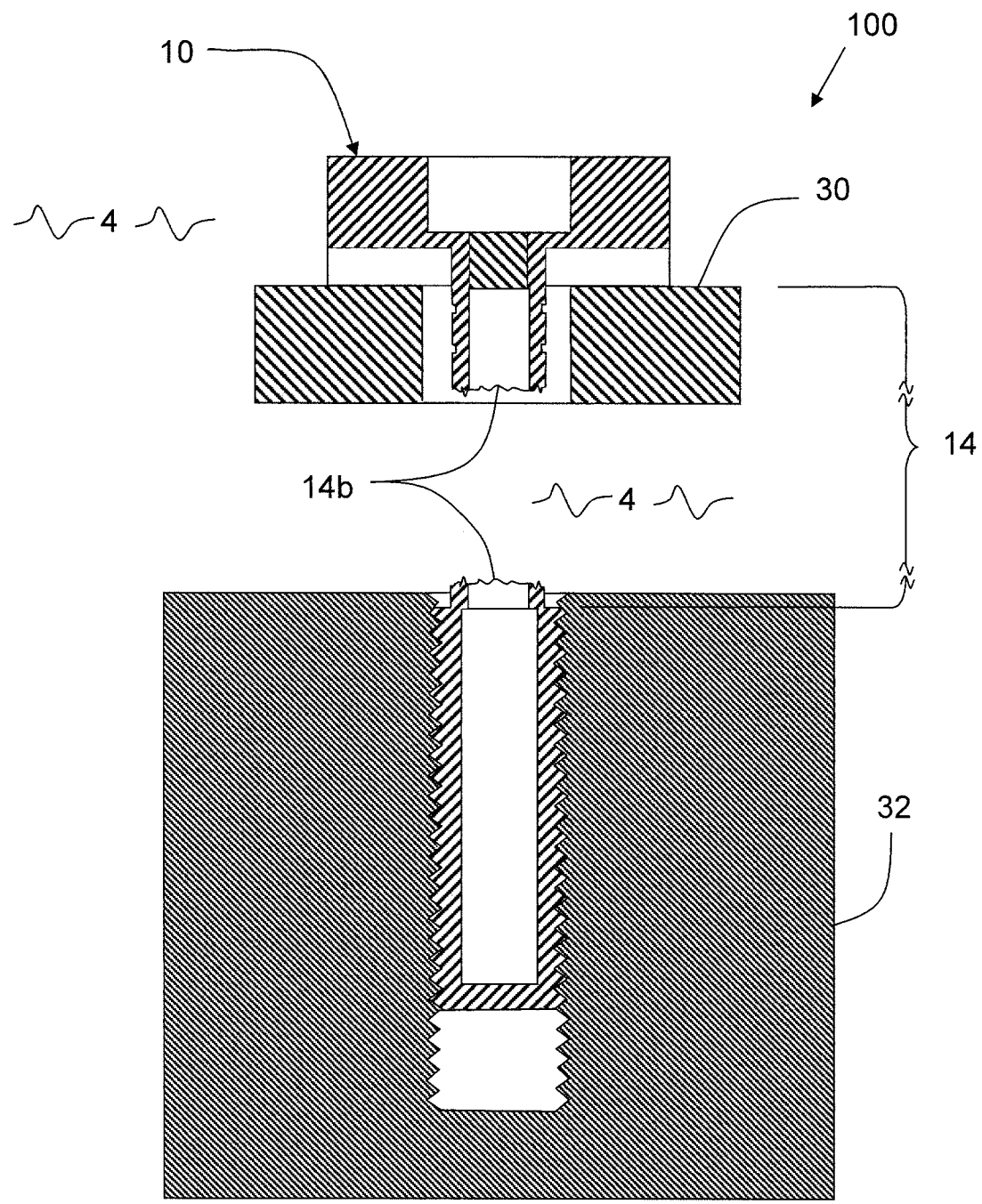
FIG. 5 shows a schematic cross-sectional view of the release system of FIG. 3 with the fastener release mechanism actuated.

Referring now also to FIG. 5, there is shown a schematic cross-sectional view of release system 100, similar to FIG. 4, wherein shank section 14 has fractured along line 14b and first part 30 and second part 32 have separated. As can be seen by those of skill in the art, fastener release mechanism 10 acts in the manner of an explosive fastener (well known in the art), though without the requirement for an explosive charge.

What has thus been described is fastener release mechanism (10), which operates utilizing a pressure differential between the mechanism (10) and the surrounding medium (4). A sealed cavity (18) is fabricated within a shank section (14) of the mechanism (10). When used in a releasable system (100), the shank section (14) is exposed to the surrounding medium (4) through a plurality of channel bores (22) fabricated into a head section (12) of the fastener release mechanism (10).

The shank section (14) includes one or more seams (14*a*) or scored areas designed to cause the failure of the shank section (14) when a pressure differential between the pressure of the surrounding medium (4) against the shank section (14) and the pressure within the cavity (18) reaches a designed fracture pressure. The fracture of the shank section (14) releases a part (32) held in place by the thread section (16) of the fastener release mechanism (10).

Figure 6:
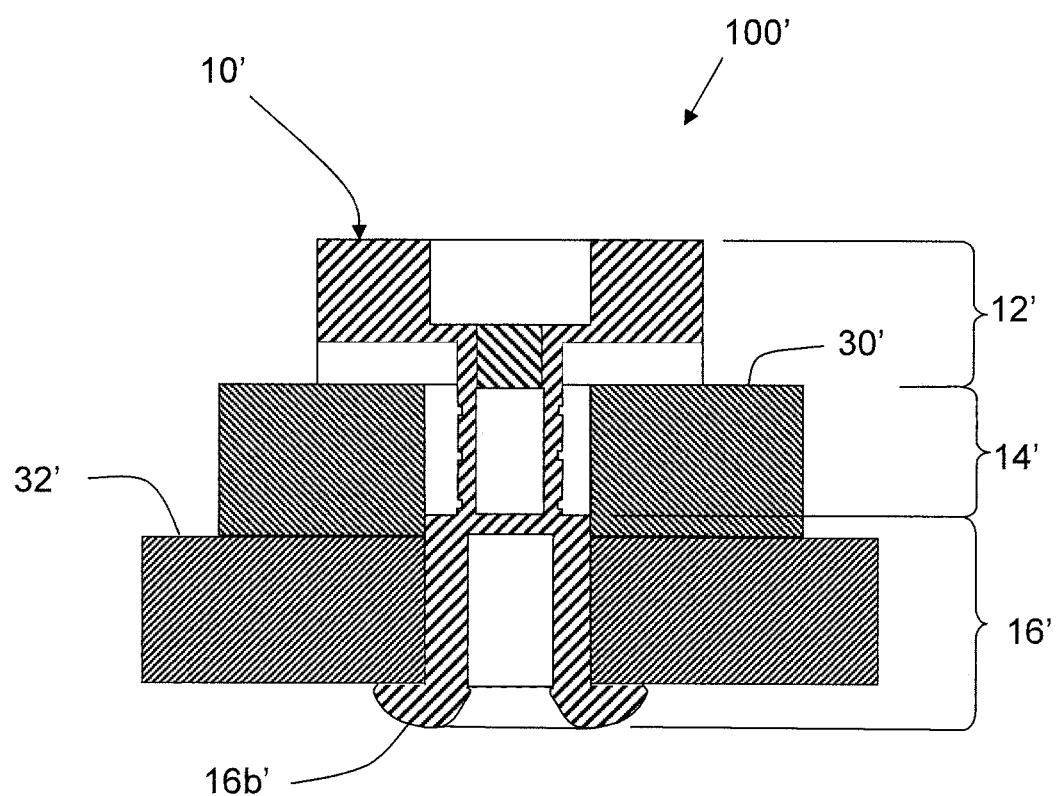
FIG. 6 shows a schematic cross-sectional view, similar to that of FIG. 4, of an alternate release system.

Obviously, many modifications and variations of the present invention may become apparent in light of the above teachings. As shown in FIGS. 1-5, fastener system 10 is configured as a typical bolt. Other configurations of fasteners are possible, such as rivets, studs and the like. Referring now to FIG. 6, there is shown a schematic cross-section, similar to FIG. 4, of system 100', wherein fastener 10' is configured as a rivet. Head section 12' and shank section 14' are similar to head section 12 and shank section 14, shown in FIG. 4. Holding section 16' has a malleable end 16*b'*, which is deformed to secure second part 32' to first part 30', similar to rivets known to those of skill in the art.

As another example, second part 32 may have a through bore in lieu of threaded bore 36 and thread section 16 may extend through second part 32, with a threaded nut mated onto thread section 16 to secure first part 30 to second part 32.

Figure 7:
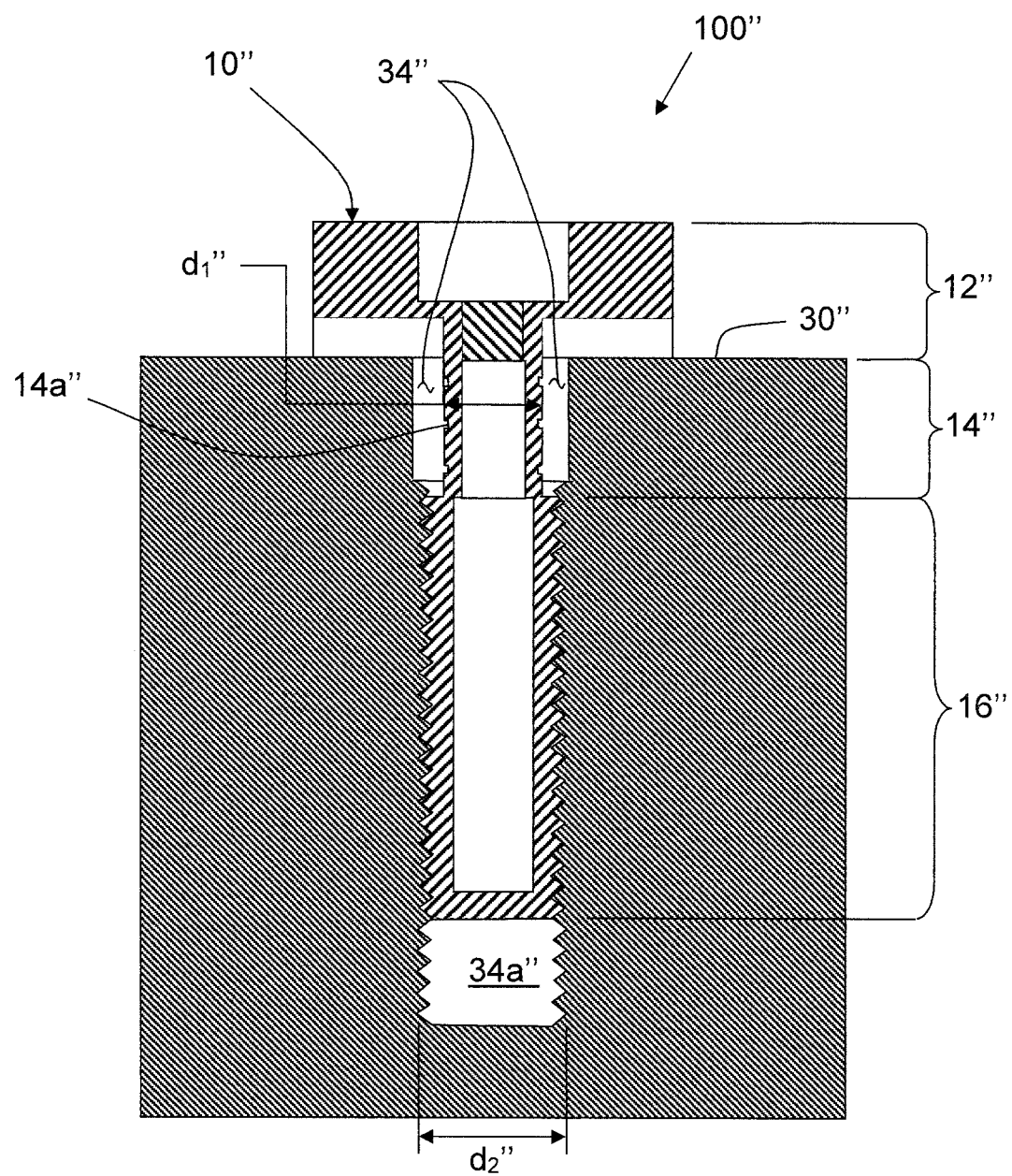
FIG. 7 shows a schematic cross-sectional view, similar to that of FIG. 4, of another alternate release system.

Referring now to FIG. 7, there is shown a schematic cross-sectional view, similar to FIG. 4, of alternate system 100", wherein fastener 10" is mated directly to first part 30". In lieu of full bore 34 shown in FIG. 4, first part 30" includes partial bore 34" with contiguous threaded bore 34*a"* appended thereto. Thread section 16" mates with contiguous threaded bore 34*a"*. When the design differential pressure is reached, the fracture of seam 14*a"* releases first part 30" from fastener 10". Those of skill in the art will recognize that, for ease of fabrication, partial bore 34" may also be threaded. In this case, diameters $d_1"$ of shank section 14" and $d_2"$ of threaded section 16" need to be sufficiently different to allow shank section 14" to fail. The possible configurations of fasteners each have the following common elements or sections-a fracturing section (shank section 14, 14', 14"), a mating section (thread or holding section 16, 16', 16" and a head section (head section 12, 12', 12").

As another example, system 10 can be configured such that the pressure in cavity 18 can exceed that of surrounding medium 4, or the pressure of surrounding medium 4 can exceed that of cavity 18. While the fabrication of fastener release mechanism 10 may be eased by extending cavity 18 into threaded section 16, as shown in FIGS. 1-5, fastener release mechanism 10 can be configured with cavity 18 located only within shank section 14.

Further, while FIGS. 1-5 show multiple seams 14*a*, it will be understood that there need only be a single seam or weakened section 14*a* about shank section 14 designed to fail at the desired differential pressure. Additionally, fastener release mechanism 10 may be fabricated with diameter $d_1$ of shank section 14 the same as diameter $d_2$ of thread section 16. In this configuration, diameter $d_3$ of full bore 34 would necessarily be greater than both diameter $d_1$ and diameter $d_2$ to allow medium 4 to surround shank section 14.

It will be understood that many additional changes in details, materials, steps, and arrangements of parts which have been described herein and illustrated in order to explain the nature of the invention, may be made by those skilled in the art within the principle and scope of the invention as expressed in the appended claims.

What is claimed is:

1. A fastener release mechanism for releasably securing a first part to a second part, comprising:
   a shank section of a fastener configured to pass through a bore in said first part and mate with said second part, said shank section having an outer surface and a sealed, airtight cavity disposed therein, said sealed cavity having a first pressure within it;
   a head section of said fastener radially-extending from a distal end of said shank section, said cavity extending through said head section with a plug disposed therein sealing said cavity, said head section having a lower surface for abutting said first part with at least one passage disposed therein radially-extending between an outer surface of said head section and said outer surface of said shank section, said at least one passage providing access for a fluid surrounding said fastener to surround said outer surface of said shank section within said bore, said fluid having a second ambient pressure; and
   a fracture seam disposed on said outer surface of said shank section within said bore, said fracture seam designed to cause said shank section to fracture when a pressure differential between said second ambient pressure and said first pressure within said cavity exceeds a design pressure differential, releasing said first part from said second part.

2. The mechanism of claim 1, wherein said fastener further comprises a holding section attached to said shank section distant from said head section, said holding section configured to pass through said bore in said first part and mate with said second part, said head section capable of securing said first part against said second part.

3. The mechanism of claim 2, wherein said holding section comprises threads capable of mating with a threaded bore in said second part.

4. The mechanism of claim 2, further comprising:
   a plurality of threads fabricated on said holding section, said holding section capable of passing through a bore in said second part; and
   a threaded nut mating with said threads and capable of being secured against said second part.

5. A system for releasably securing a first part to a second part, said system comprising:
   a shank section of a fastener configured to pass through a bore in said first part and mate with said second part, said shank section having an outer surface and a sealed, airtight cavity disposed therein, said sealed cavity having a first pressure within it;
   a head section of said fastener radially-extending from a distal end of said shank section, said cavity extending through said head section with a plug disposed therein sealing said cavity, said head section having a lower surface for abutting said first part with at least one passage disposed therein radially-extending between an outer surface of said head section and said outer surface of said shank section;

a holding section attached to said shank section distant from said head section, said holding section configured to pass through said bore in said first part and mate with said second part, said head section capable of securing said first part against said second part; and a fracture seam disposed on said outer surface of said shank section within said bore, said at least one passage providing access for a fluid surrounding said system to enter said bore and surround said outer surface of said shank section, said fracture seam designed to cause said shank section to fracture when a pressure differential between the ambient pressure of said fluid and said first pressure exceeds a design pressure differential, releasing said first part from said second part.

6. The system of claim 5, wherein said holding section comprises threads capable of mating with a threaded bore in said second part.

7. The system of claim 5, further comprising:
a plurality of threads fabricated on said holding section, said holding section capable of passing through a bore in said second part; and
a threaded nut mating with said threads and capable of being secured against said second part to mate said holding section to said second part.

8. A system for releasably securing a fastener to a first part, said system comprising:
a shank section of said fastener configured to pass through a bore in said first part and mate with said first part, said shank section having an outer surface and a sealed, airtight cavity disposed therein, said sealed cavity having a first pressure within it;
a head section of said fastener radially-extending from a distal end of said shank section, said cavity extending through said head section with a plug disposed therein sealing said cavity, said head section having a lower surface for abutting said first part with at least one passage disposed therein radially-extending between an outer surface of said head section and said outer surface of said shank section;
a holding section attached to said shank section distant from said head section, said holding section configured to pass through said bore in said first part and mate with said first part; and
a fracture seam disposed on said outer surface of said shank section within said bore, said at least one passage providing access for a fluid surrounding said system to enter said bore and surround said outer surface of said shank section, said fracture seam designed to cause said shank section to fracture when a pressure differential between the ambient pressure of said fluid and said first pressure within said cavity exceeds a design pressure differential, releasing said head section of said fastener from said first part.

9. The system of claim 8, further comprising:
a plurality of threads fabricated on said holding section; and
a threaded portion of said bore, wherein said plurality of threads mate with said threaded portion.

10. The system of claim 8, further comprising:
a plurality of threads fabricated on said holding section, at least a portion of said threads extending beyond said first part; and
a threaded nut mating with said threads and capable of being secured against said first part to mate said holding section to said first part.

\* \* \* \* \*